United States Patent Office 3,071,267
Patented Jan. 1, 1963

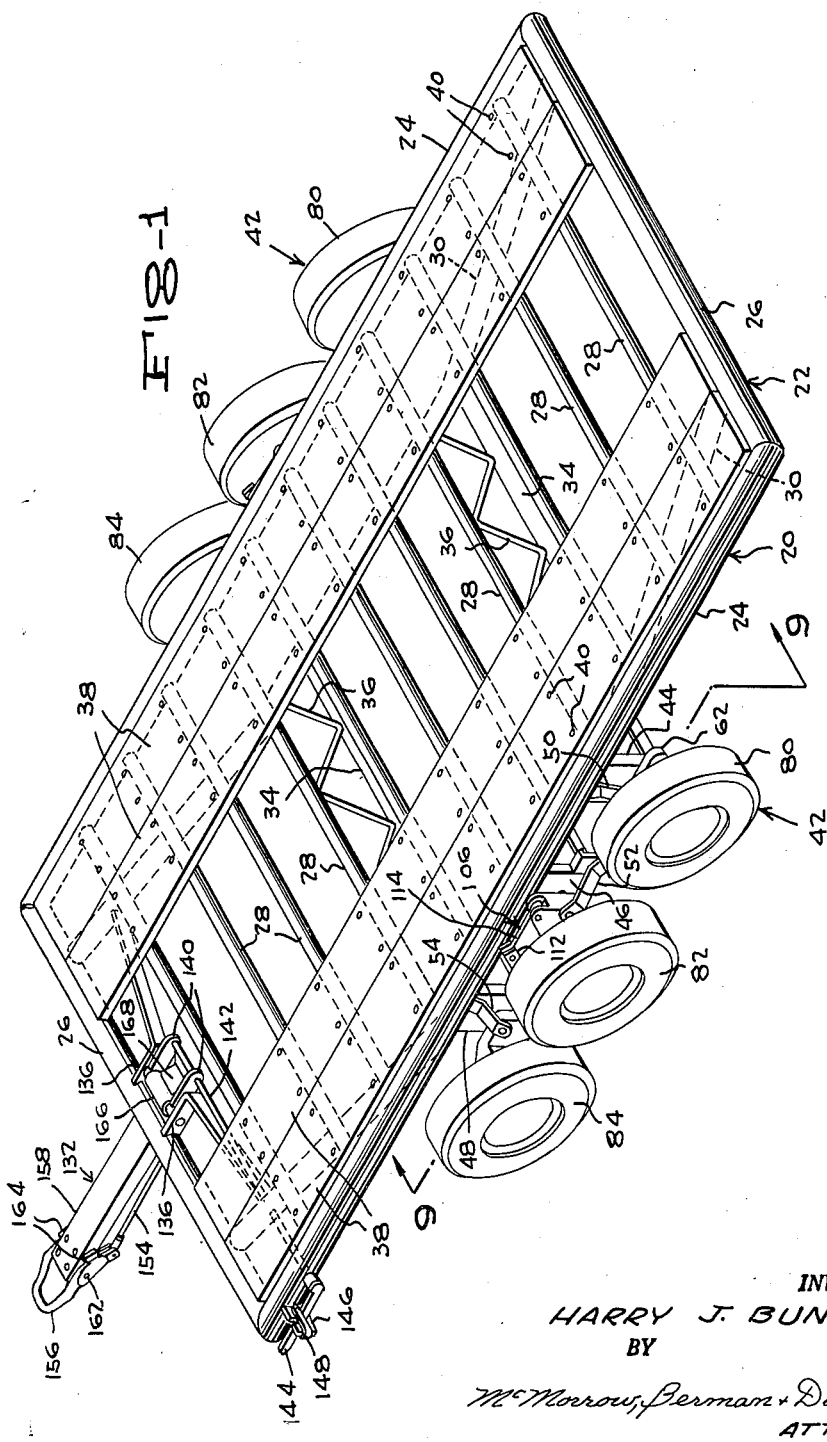

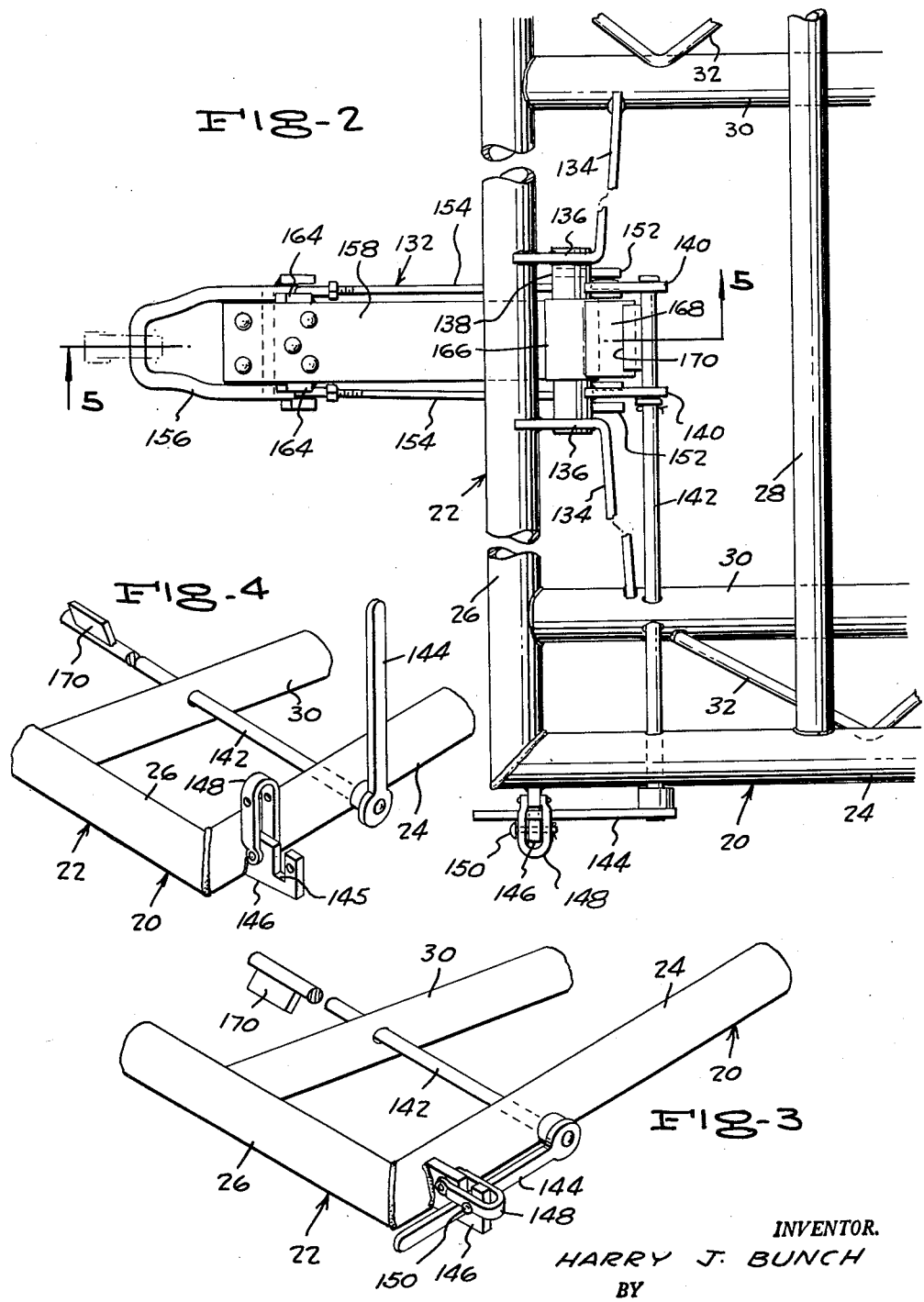

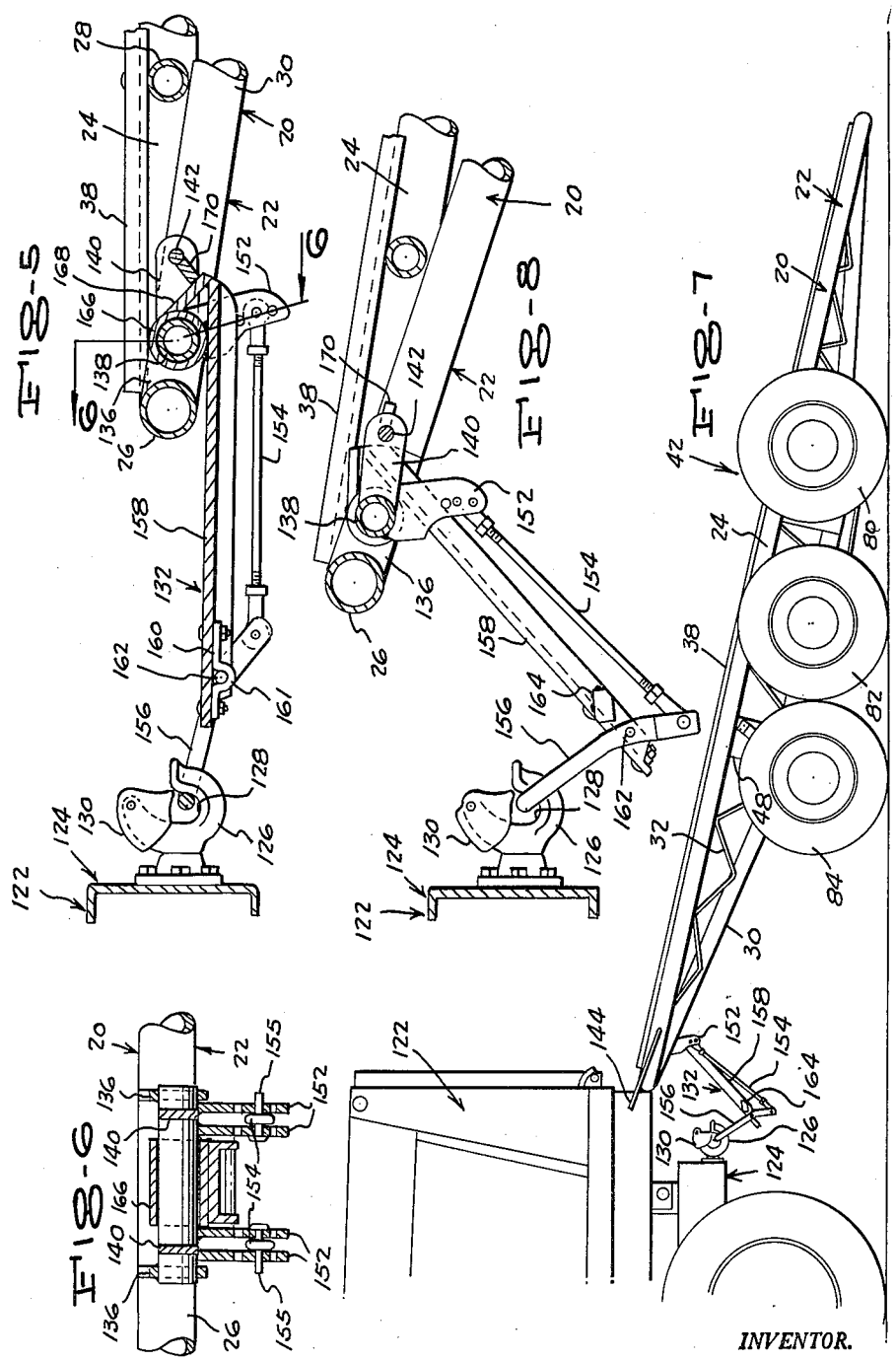

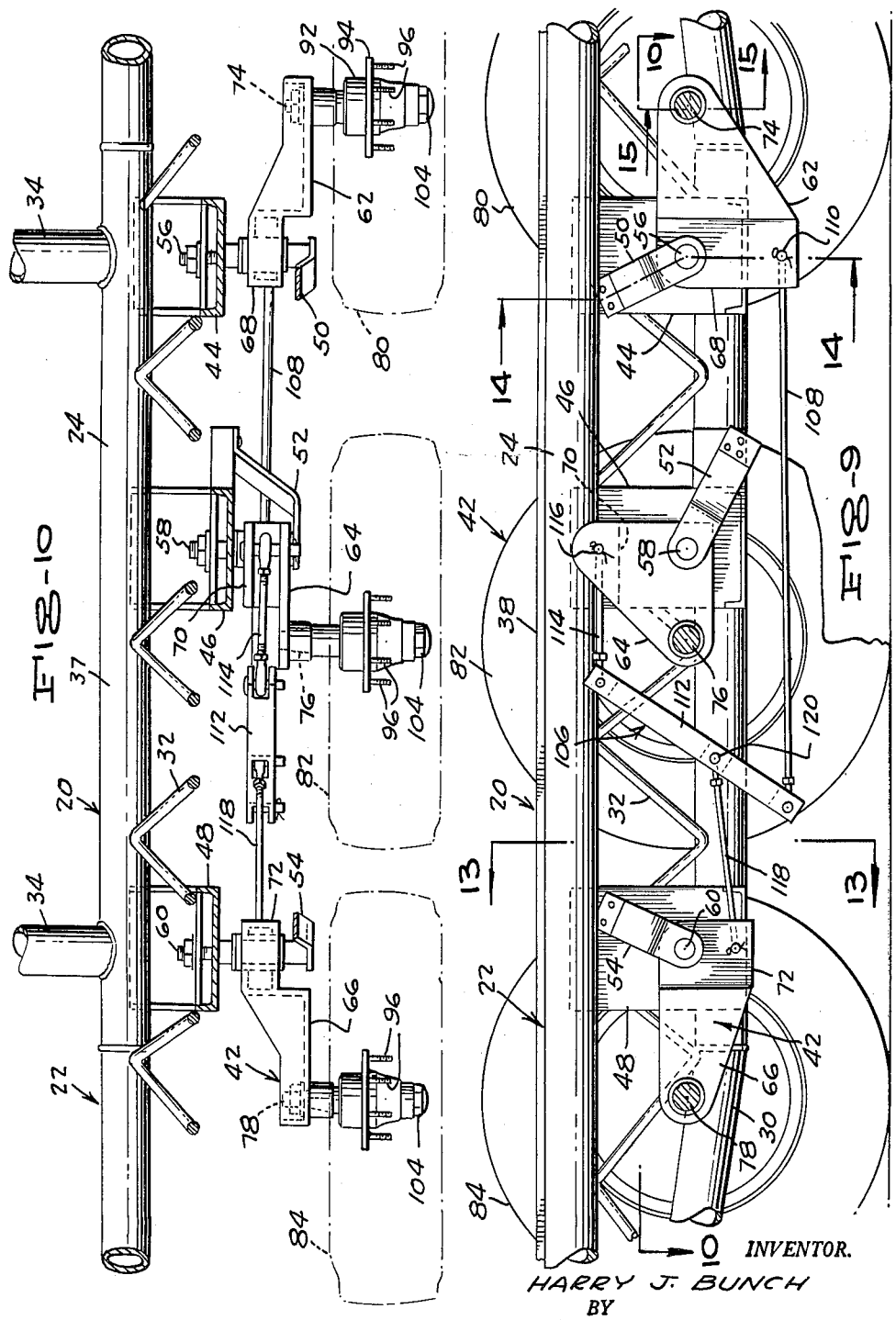

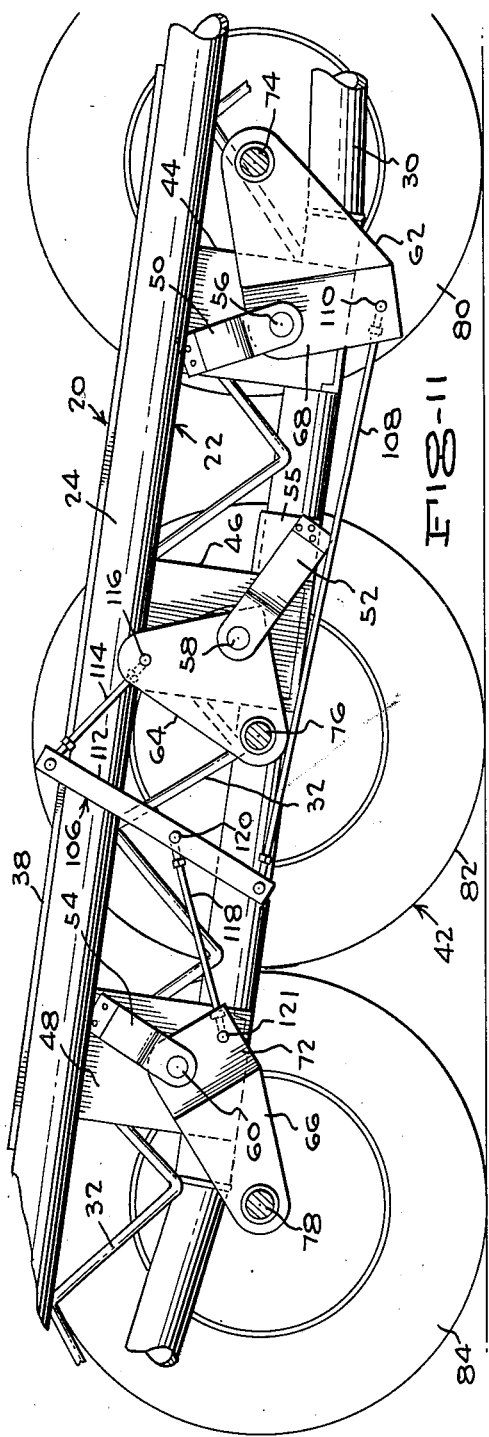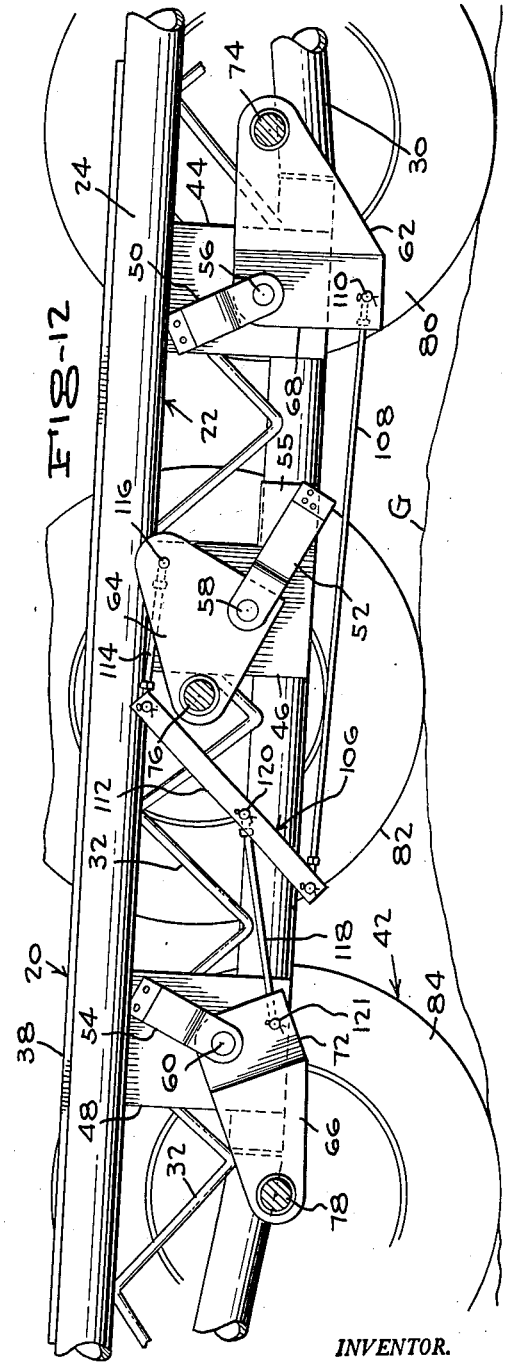

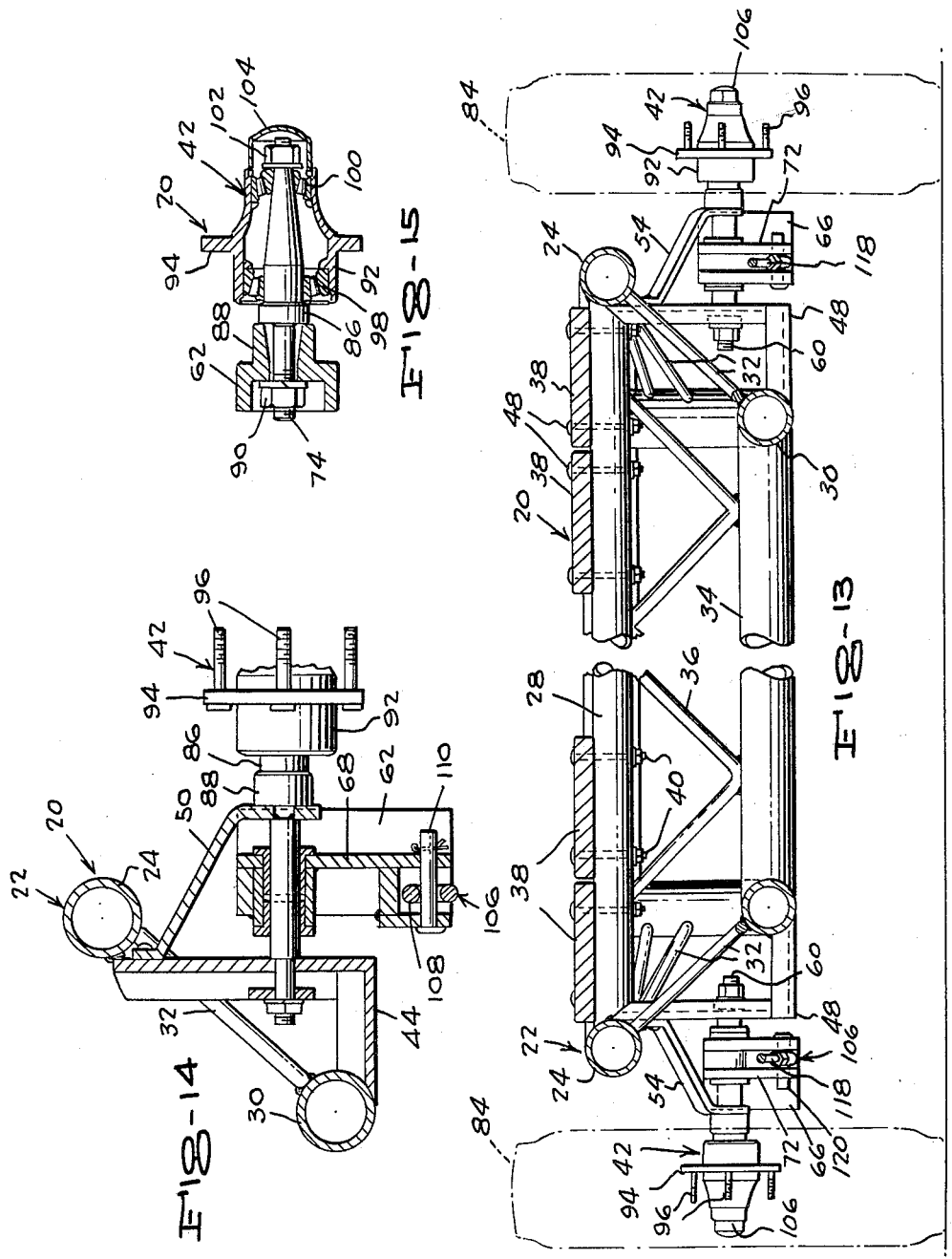

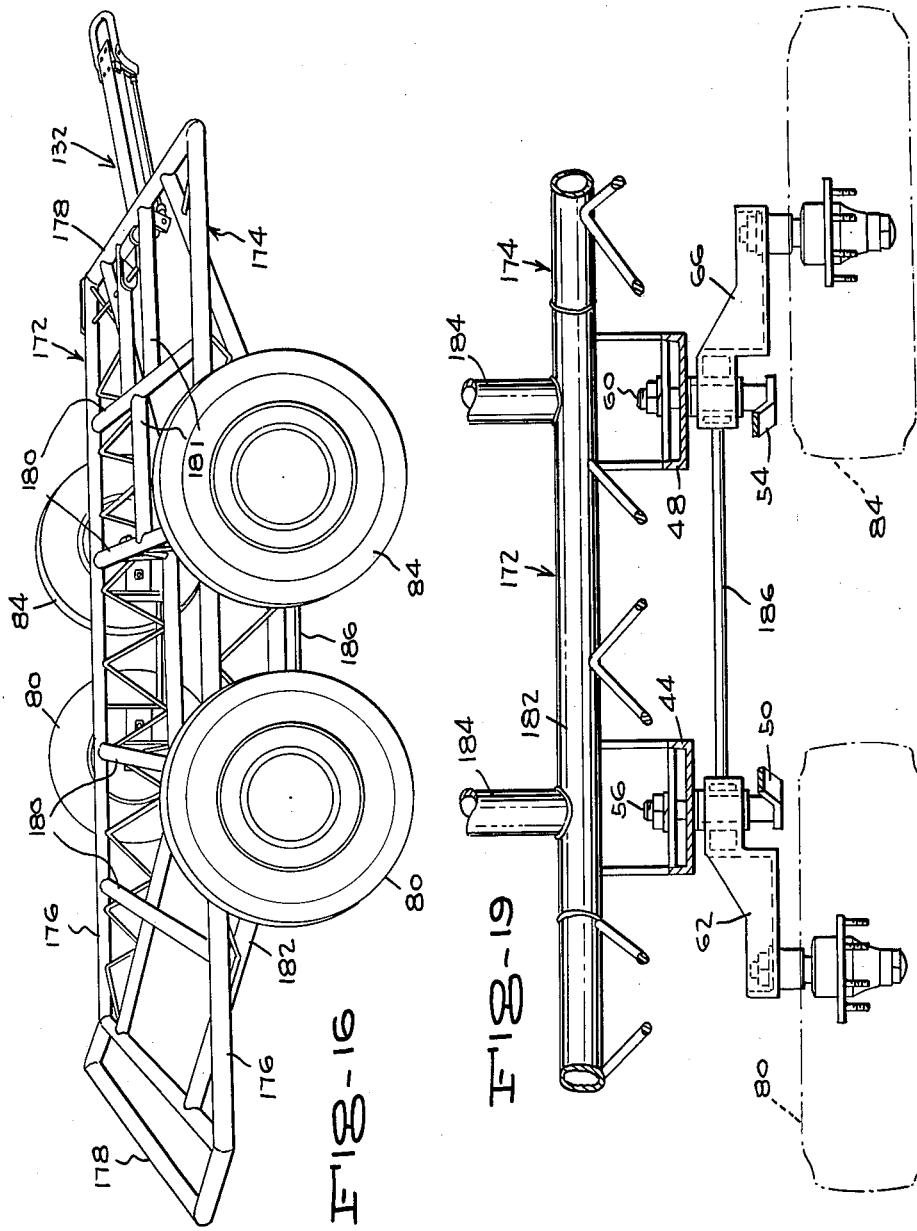

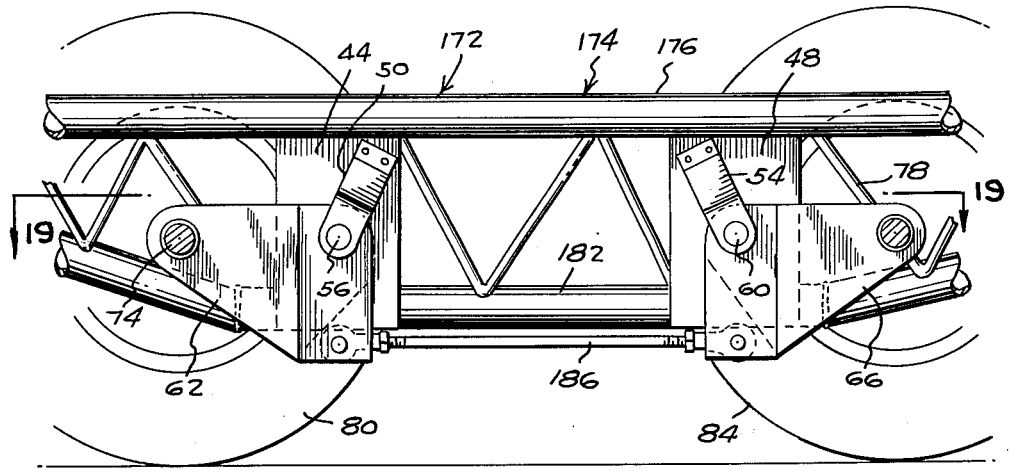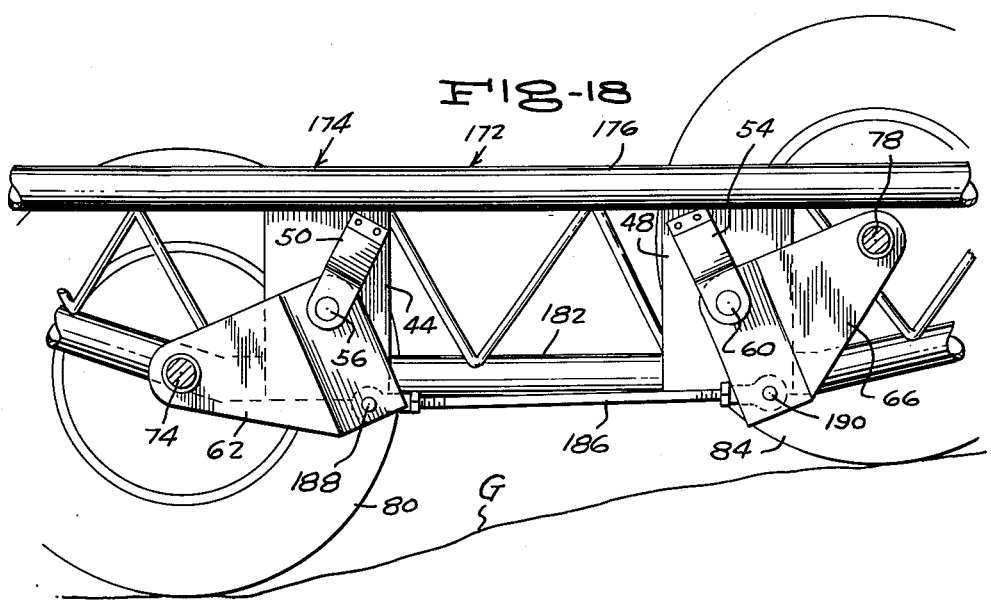

3,071,267
HITCH AND TRAILER HAVING IMPROVED
WHEEL SUSPENSION OF THE TANDEM TYPE
Harry J. Bunch, 1108 Clay Ave., Louisville 19, Ky.
Filed Feb. 19, 1960, Ser. No. 9,978
11 Claims. (Cl. 214—505)

This invention relates generally to trailers, and more specifically, has reference to a trailer construction of the type designed for transporting heavy implements, earth-working machines, and the like.

Trailers of the character referred to must, as already recognized in the art, be exceptionally rugged, swiftly attachable to or detachable from a traction vehicle, and adapted to the maximum extent for facility in loading or unloading of the equipment, implements, or other objects being transported.

In addition, it is also desirable to maintain the trailer in a level position during movement, this being a particularly difficult task when the trailer is moving over comparatively rough terrain. This type of terrain is often encountered during the regular use of trailers of the character described, especially in view of the fact that it is often necessary that the trailer go into fields, excavations, or other areas for the purpose of loading or unloading of the objects to be transported.

The broad object of the present invention is to provide a trailer construction which will be especially well adapted to meet the various requirements briefly set forth above.

A more specific object of the present invention is to provide a trailer construction of the class described above, characterized by a novel, improved wheel suspension of the tandem type. In accordance with the invention, the wheel suspension referred to is especially designed to permit relative up-and-down movements of the several wheels, according to the terrain encountered, without disturbing the desired level position of the trailer while the same is in movement toward its destination.

Another object is to provide an improved wheel suspension of the character described which will not only have the specific functional arrangement referred to above, but also, will permit the trailer frame to be moved to an inclined position in which the same extends as a ramp between the ground surface and the traction vehicle. In carrying out this object, it is proposed to design the wheel suspension in such a way as to provide a novel connecting linkage between the several wheels on each side of the trailer, thus to permit the trailer frame to move between its normal level position and the mentioned inclined position responsive to a minimum amount of effort on the part of the workers engaged in the loading, unloading, or hitching operations performed with the trailer. It is further proposed, in this regard, to so design the hitch and trailer assembly as to permit the trailer to be hitched to the traction vehicle while the trailer is in its normal, level position, with a slight, subsequent rearward movement of the traction vehicle being effective to act upon the hitch mechanism in such a way as to cause the trailer to assume the desired, inclined, loading or unloading position.

Another object is to so design the wheel suspension, and the associated hitch mechanism, as to cause the trailer to assume its normal, level position after loading of the equipment thereon, in response to passage of the equipment up the inclined ramp defined by the tilted trailer. It is further proposed, in this regard, to so articulate the hitch mechanism as to facilitate the resumption of a normal, level position by the trailer. In carrying out this object, it is even further proposed to facilitate the movement of the trailer from its inclined to its level position responsive to a slight forward motion of the traction vehicle, in the event the trailer has not moved to said level position on loading of the same.

Yet another important object of the present invention is to provide a particularly effective balancing action, resulting from the improved wheel suspension and the connection between adjacent wheels of said suspension, thus to insure to the maximum extent against undue tilting of the trailer during its regular movement toward its destination.

Still another object of the invention is to provide an improved wheel suspension of the tandem type which will be capable of embodiment in trailers of different lengths, with different numbers of wheels, thus to make use of the principles of the invention in a tandem wheel suspension of the three-wheel as well as the two-wheel type.

Another object is to provide improved distribution of the load weight, substantially planar movement of the frame and load during transport, and maximum shock absorption.

Yet another important object of the present invention is to incorporate in the trailer construction an improved hitch means, which will be designed to coact with the other components of the invention, including the wheel suspension, trailer frame, etc., by means of a novel, improved articulation of the hitch mechanism. In carrying out this object, it is further proposed to incorporate in the hitch mechanism a quickly operable locking means, which will be swiftly adjustable to a locking position when the trailer is in its normal, level position, the lock means of the hitch mechanism being effective to prevent relative movement of the articulated components of said mechanism while the trailer is in regular movement toward its destination.

It is further proposed to provide a hitch mechanism which, on arrival of the trailer at its destination, can be swiftly operated to an unlocked position, so as to automatically adjust in response to backing up of the traction vehicle or movement of the load toward the rear end of the trailer. In this way, the trailer is swiftly brought to an inclined position so as to define an unloading ramp for the supported equipment or other heavy objects.

Still another object of importance is to so design the three-wheel and two-wheel trailer constructions, both of which make use of the basic principles of the invention, as to permit both constructions to make use of the same hitch mechanism, while also having a maximum number of interchangeable parts. In this way, it is proposed to reduce manufacturing costs to a minimum, while still facilitating the construction and sale of trailers designed to best fit the needs of the purchaser.

Another object is to eliminate "jackknifing," eliminate or measurably reduce bouncing, improve turning, and prevent wobbly side motion.

Still another object of importance is to provide a trailer of the character described which will be exceptionally rugged, will be designed for trouble-free operation, will be relatively light in relation to the load capable of being transported thereby, and will have maximum load-supporting area in relation to the over-all weight of the structure.

Other objects will appear from the following description, the claims appended thereto, and from the annexed drawing, in which like reference characters designate like parts throughout the several views, and wherein:

FIGURE 1 is a perspective view of a six-wheel trailer, according to the present invention, that is, a trailer of the kind having three wheels arranged in tandem at each side thereof;

FIGURE 2 is an enlarged, fragmentary top plan view of the head end of the trailer, showing the hitch mechanism;

FIGURE 3 is a fragmentary, enlarged perspective view showing a fragment of the front portion of the trailer, illustrating the lock means of the hitch mechanism in its locking position;

FIGURE 4 is a view similar to FIGURE 3 in which the lock means is shown in its released position;

FIGURE 5 is a longitudinal sectional view, on the same scale as FIGURE 2, taken through the hitch mechanism and the front portion of the trailer, substantially on line 5—5 of FIGURE 2, the trailer and hitch mechanism being illustrated in the positions assumed thereby during movement of the trailer toward its destination;

FIGURE 6 is a transverse sectional view through the hitch mechanism, on the same scale as FIGURE 5, taken on line 6—6 of FIGURE 5;

FIGURE 7 is a side elevational view of the trailer on a reduced scale, with a traction vehicle being shown fragmentarily, the trailer and hitch mechanism being illustrated in the positions assumed thereby during loading or unloading of the trailer;

FIGURE 8 is an enlarged view on the same scale and cutting plane as FIGURE 5, showing the trailer and hitch mechanism in the FIGURE 7 positions thereof, during loading or unloading;

FIGURE 9 is a longitudinal sectional view, on the same scale as FIGURE 2, taken substantially on line 9—9 of FIGURE 1, showing the intermediate portion of the trailer and illustrating the wheel suspension in the position assumed thereby during the regular movement of the trailer while maintained in a level condition;

FIGURE 10 is a horizontal section substantially on line 10—10 of FIGURE 9, on the same scale as FIGURE 9, the ground wheels being illustrated in dotted lines;

FIGURE 11 is a view on the same scale and cutting plane as FIGURE 9, with the trailer frame and the wheel suspension being illustrated in the positions assumed thereby when the trailer is inclined to serve as a loading or unloading ramp on level ground;

FIGURE 12 is a view like FIGURE 11, wherein the trailer frame and wheel suspension are illustrated in positions that they might assume during passage of the structure over uneven ground;

FIGURE 13 is a transverse sectional view, on the same scale as FIGURE 9, taken on line 13—13 of FIGURE 9, with the ground wheels being shown in dotted lines, portions being broken away;

FIGURE 14 is a transverse sectional view, the scale being enlarged above that of FIGURE 9, taken substantially on line 14—14 of FIGURE 9, the ground wheel being removed;

FIGURE 15 is a detail sectional view through one of the wheel spindle assemblies, taken on line 15—15 of FIGURE 9, the scale being enlarged above that of FIGURE 9;

FIGURE 16 is a perspective view of a modified form of the invention, showing a four-wheel trailer wherein two wheels are arranged in tandem on each side of the trailer;

FIGURE 17 is a longitudinal sectional view through the trailer shown in FIGURE 16, taken immediately adjacent the wheels provided at one side of the trailer, the scale being enlarged above that of FIGURE 16, the parts being shown in the positions assumed thereby when the trailer is on level ground, in regular movement toward its destination;

FIGURE 18 is a view like FIGURE 17 in which the wheel suspension is shown in a position assumed thereby when passing over uneven ground; and FIGURE 19 is a horizontal sectional view substantially on line 19—19 of FIGURE 17, on the same scale as FIGURE 17, with the ground wheels being shown in dotted lines.

Referring to the drawing in detail, in the form of the invention illustrated in FIGURES 1–15, the structure constituting the invention has been generally designated at 20, and includes a rectangular, generally flat frame elongated in a fore-and-aft direction, said frame being generally designated at 22 and including elongated, straight, parallel, tubular side rails 24 fixedly joined at their respective extremities to front and rear end rails 26. Spaced comparatively closely over the full length of the frame are tubular cross members 28, each of which is welded or otherwise fixedly joined at its opposite ends to the respective side rails 24, in the common plane of the side and end rails. The cross members 28 thus provide an effective cross-bracing means in the frame, thereby to impart thereto the requisite strength for supporting heavy objects, such as earth-working equipment (not shown), or other apparatus that is to be moved.

The frame 20 is further strengthened, through the provision of both longitudinal and transverse truss means. The longitudinal truss means comprises a pair of transversely spaced longitudinal truss rails 30, spaced inwardly a short distance from the respective side rails 24. The truss rails 30 have intermediate portions spaced downwardly from the common plane of the side rails 24, end rails 26, and cross members 28. The intermediate portions of the longitudinal truss rails merge into end portions, which gradually slope upwardly in opposite directions from the intermediate portions, extending at their ends into direct contact with the respective end rails 26, to which they are fixedly secured by means of welding, or the like.

The longitudinal truss means further includes longitudinal truss rods, fixedly connected between the truss rails and the respective, adjacent side rails 24, in zigzag fashion, whereby to cooperate with the longitudinal truss rails in defining longitudinal trussing means adjacent the respective sides of the frame. This rigidifies the frame against flexure in a longitudinal direction under the weight of a supported load.

Connected between the longitudinal truss rails are transverse truss rails 34. These are believed shown to best advantage in FIGURE 1. As will be noted in this figure of the drawing, there are two transverse truss rails 34, each of these underlying one of the cross members 28. Transverse truss rods, extending in zigzag paths, are fixedly connected between the respective transverse trussing rails and the cross members disposed immediately thereabove.

The tranverse truss rails are located adjacent the opposite ends of the intermediate portions 37 of the longitudinal truss rails 24 (see FIGURE 10), in a preferred embodiment.

From the description so far provided, it will be seen that the frame includes a substantially planiform, rectangular top surface, said frame being composed largely of tubular stock so as to provide maximum lightness in relation to the strength of the frame. It will further be observed that the frame is effectively braced against both longitudinal and transverse pressures, thus to produce a rugged support means for the load that is to be transported by means of the trailer.

To provide a bed or supporting platform for the load, I utilize elongated, heavy planks 38, which are fixedly secured by means of connecting bolts 40 to the several cross members 28. A pair of planks 38 is provided at each side of the frame, as shown in FIGURE 1, so as to provide runways for the wheels of heavy equipment, such as bulldozers, tractors, heavy farm implements, and the like, during the movement of said equipment onto or off of the trailer.

Of course, the planking can be arranged in any way desired, according to the use to which the trailer is to be put. It is presently preferred that the frame be formed as illustrated and described, but it will be understood that obviously, various frame structures, including braces selectively formed and arranged as desired, may be utilized.

Medially between the opposite ends of the frame, I provide tandem wheel assemblies 42, each assembly extending along the adjacent side of the frame. The assemblies 42 are of identical but opposite construction, and accordingly, the description of one will suffice for both.

In the form of the invention shown in FIGURES 1-15, I provide three wheels in each assembly, each wheel being suspended, in a manner to be made clearly apparent hereinafter, from an associated wheel hanger that is rigidly connected to the frame.

Thus, referring to FIGURES 9 and 10, it will be seen that I provide three hangers, including a rear hanger 44, an intermediate hanger 46 spaced rearwardly therefrom, and a front hanger 48, the distance between the hangers 46 and 48 being somewhat greater than the distance between the hangers 44 and 46.

All the hangers are identically formed, and as will be noted from FIGURES 13 and 14, said hangers are of right-angular configuration, with each hanger comprising wide, shallow, perpendicularly related plates fixedly joined to each other. The upper end of each hanger is welded or otherwise fixedly secured to the adjacent side rail 24, while the inner end of the hanger is projected laterally inwardly into engagement with the adjacent longitudinal truss rail 30, to which it is fixedly joined by welding or equivalent means.

Rear, middle, and front hanger arms 50, 52, 54, respectively, are fixedly secured in position overlying the several hangers, as shown in FIGURES 10 and 11, and as also shown to good advantage in FIGURES 13 and 14. The rear and front hanger arms 50, 54 have upper ends riveted or otherwise fixedly secured to the upper end portions of the hangers 44, 48 respectively. As shown in FIGURE 11, arms 50, 54 extend downwardly, and at the same time, said arms decline in a direction outwardly from their associated hangers (see FIGURES 13 and 14).

The intermediate hanger arm 52, as shown in FIGURE 11, has one end riveted or otherwise fixedly secured to a plate 55 that is fixedly attached to the longitudinal truss rail 30. Hanger arm 52 extends upwardly forwardly from its fixed connection to said plate 55, terminating in outwardly spaced relation to the middle hanger 46.

The several hanger arms are provided, at their free ends, with bearing openings aligned transversely with corresponding openings provided in the associated hangers. Extending through the transversely aligned openings are rear, middle, and front pivot pins 56, 58, 60, respectively, supporting rear, middle, and front bell cranks 62, 64, 66, respectively.

In the illustrated example, the several bell cranks are of approximately triangular configuration, although this is not critical to successful operation of the invention. The bell cranks, by reason of the arrangement illustrated and described, are carried by their associated pivot pins, in the spaces between the hangers and the associated hanger arms.

The bell cranks are suitably reinforced, and in the illustrated example, the rear bell crank 62 has, where the pivot pin 56 extends therethrough, a laterally inwardly offset portion 68 (see FIGURES 11 and 14). The middle bell crank 64 is formed somewhat differently, and as shown in FIGURE 10, has a channel portion 70 at its upper corner. The front bell crank 66 has an inwardly offset portion 72, corresponding to the portion 68 of the bell crank 62 (see FIGURE 10), to receive the pivot pin 60 about which said front bell crank is swingable.

The several bell cranks carry, in spaced relation to their associated pivot pins 56, 58, and 60, horizontally outwardly projecting wheel spindles. Thus, as best shown in FIGURES 9 and 10, there are rear, middle, and front wheel spindles 74, 76, 78, respectively, carried by the bell cranks 62, 64, 66, respectively.

Rotatably supported upon the spindles are rear, middle, and front rear wheels 80, 82, 84, which are mounted upon the spindles by the means shown to best advantage in FIGURE 15.

Actually, this constitutes a mounting which, per se, is basically similar to that employed in conventional truck or automobile wheel mountings. Thus, in a suitable embodiment, spindle 74 may be provided with a collar 86 abutting against a laterally outwardly opening sleeve 88 welded to the adjacent bell crank. Nut 90 is threaded upon the inner end of the spindle, so as to cooperate with the collar in fixedly securing the spindle to the bell crank.

The outer end portion of the spindle tapers, and extends axially of and within a hollow hub 92, having intermediate its ends a mounting flange 94. Angularly, uniformly spaced studs 96 project outwardly from and are rigid with the flange, as shown in FIGURE 13, and at opposite ends of the hub, there are provided roller bearings 98, 100 to rotatably mount the hub, and hence, the wheel upon the spindle. A nut 102 is threaded upon the outer end of the spindle, to retain the bearings, and a protective cap 104 is applied to the outer end of the hub, enclosing the nut.

It will be understood that any suitable wheel mounting can be employed, although that which has been illustrated has been found to be well adapted to use in the trailer comprising the present invention.

By reason of the construction so far illustrated and described in reference to the tandem wheel assemblies, it may be noted that each wheel is suspended from the frame in an arrangement which amounts to a crank axle for each of the wheels.

Thus, each wheel is individually suspended from the frame in such a way as to permit its axis of rotation, defined by its associated wheel spindle, to travel in an arcuate path about the pivot pin on which the associated bell crank is supported. Thus, the wheel spindle 74 of the rear wheel 80 travels in an arcuate path having pivot pin 56 as its center, and the same arrangement obtains for the middle and front wheels in connection with their wheel spindles and pivot pins.

The arrangement wherein the individual wheel axes may travel in arcuate paths about the pivot axes of their associated bell cranks will be readily perceived by comparison of FIGURES 9 and 12, it being seen that in FIGURE 12, the middle and front wheel axes have traveled in arcuate paths about their centers 58 and 60, respectively, from the normal positions thereof shown in FIGURE 9.

It follows that the pivot axes of the several bell cranks are, in turn, adapted to travel in arcuate paths about the wheel spindles, as may be noted by comparison of FIGURES 9 and 11. In FIGURE 9 the trailer is completely level, with the wheels on level ground so that their axes defined by the spindles 74, 76, 78 are all in a common horizontal plane. In FIGURE 11 the wheels are still on completely level ground, so that their wheel axes remain in the horizontal plane. However, the pivot axes of the several bell cranks, said bell crank axes being defined by the pins 56, 58, 60 have traveled from the FIGURE 9 positions, in arcuate paths having the several, respective wheel spindles as centers.

Each wheel assembly 42 includes a specially designed linkage generally designated 106, interconnecting the several bell cranks. The linkages 106 have certain important functions, with respect to producing a predetermined positioning of the plane of the load-supporting surface of the trailer, under certain conditions to be discussed in full detail hereinafter.

Referring to FIGURES 9-12, an elongated, straight connecting rod 108 is pivotally connected by a pin 110 to bell crank 62, at a location such that the pins 56 and 110, and the spindle 74, are in triangularly spaced relation, with spindle 74 being disposed forwardly of the pin 56, and pin 110 being disposed below the pin 56.

Connecting rod or link 108 can be termed a rear link, pivotally connected at its front end to the lower end of a connector bar 112, disposed forwardly of the bell crank 64. Connector bar 112, at its upper end, has a pivotal connection to the front end of a relatively short, intermediate connecting link or rod 114, the rear end of which is pivotally connected at 116 to the bell crank 64. The pins 116, 58, and wheel spindle 76, are triangularly spaced upon the bell crank 64, with the pin 116 normally being disposed rearwardly of and above the spindle 76, while the pin 58 is disposed rearwardly of the spindle 76, below the pin 116.

A front connecting link or rod 118 has a pivotal connection at 120 to the connector bar 112, intermediate the opposite ends of the connector bar. Link 118, at its front end, is pivotally connected at 121 to the bell crank 66. Again, the axes defined at 60, 121, and 78 are triangularly spaced upon the bell crank 66, with the wheel spindle being disposed forwardly of the pin 60, and with connection 121 being disposed below the pin 60 rearwardly of the wheel spindle 78.

Designated generally at 122 is a traction vehicle, such as a truck, having a frame 124, to the rear end of which is secured a conventional hitch element 126 provided with an upwardly opening recess 128, normally closed by a gravity latch 130 pivotally supported upon the element 126. Latch 130 is so designed as to be biased to a position exposing the recess 128, by movement of a clevis or similar hitch device into the recess. As soon as the clevis moves into the recess, the gravity latch swings back to a position closing the recess, in the manner shown to particular advantage in FIGURE 5.

The hitch means shown at 126, 128, 130 is wholly conventional, and is usable to good advantage with the hitch mechanism 132 forming an important part of the present invention.

Hitch mechanism 132, as shown in FIGURES 2–7, is operable between what might be termed a traction position shown in FIGURE 5, and a loading or unloading position shown in FIGURES 7 and 8.

Considering the particular construction of the hitch mechanism, reference should be had first to FIGURE 2, illustrating in top plan a pair of identical, but opposite mounting rods 134, having outer ends welded or otherwise fixedly secured to the fore portions of truss rails 30. The inner end portions 136 of the mounting rods 134 are turned forwardly, and are fixedly secured in transversely spaced relation to the front end rail 26.

Extending between the end portions 136, in closely spaced, parallel relation to end rail 26, is a tubular support bar 138 welded or otherwise affixed at its ends to the end portions 136. Fixedly secured to the tubular support bar 138, adjacent the ends thereof, are rearwardly projecting bearing arms 140, having transversely aligned bearing openings in which is journaled the inner end portion of an elongated, straight rock shaft 142, journaled also in one of the truss rails 30 and side rails 24, as shown in FIGURE 2. The outer end of the rock shaft is fixedly secured to a handle 144, extending radially of the rock shaft and adapted to move into and out of a notch 145 (FIGURE 4) formed in a locking plate or ear 146. Plate 146 is fixedly secured to and extends laterally outwardly from the adjacent side rail 24, forwardly of the rock shaft, and pivotally mounted upon the plate 146 is a locking loop 148, swingable between the FIGURE 3 and FIGURE 4 positions thereof. When the locking loop is in the FIGURE 4 position, the handle 144 may move upwardly out of the notch 145.

Locking of the handle is achieved by movement of the same into the notch 145, as shown in FIGURE 3, after which the locking loop is swung into position across the notch, above the handle, the loop then being locked in the FIGURE 3 position by means of a locking pin 150, extendable through registering openings of the plate 146 and loop 148.

Also fixedly secured to the end portions of the support bar 138 are depending arms 152 (see FIGURE 6), arranged in pairs, so as to embrace the looped rear ends of elongated connecting links 154, these being pivotally attached to the arms 152 by means of connecting pins 155.

At their rear ends the links 154 are pivotally connected to the front ends of the arms of a U-shaped clevis 156, mounted upon the rear end of an elongated, flat, wide clevis support plate 158. A bearing plate 160, bolted to the under side of the clevis support plate 158, has a transversely extending bearing sleeve 161 integrally formed therein, receiving a pivot pin 162, the opposite ends of which are affixed to the clevis 156, thus to mount the clevis upon the plate 158 for rocking movement about a transverse axis, between the positions shown in FIGURES 5 and 8 respectively.

Limiting movement of the clevis in a counterclockwise direction, viewing the same as in FIGURE 5, are stop blocks 164 shown to best advantage in FIGURES 2 and 8. These are affixed to the opposite sides of the clevis support plate 158, in position to engage the arms of the clevis when said arms are in the position thereof shown in FIGURES 2 and 5.

Designated at 166 is a sleeve, to which is fixedly secured a rearwardly declining, abutment plate 168 affixed to the front end of the clevis support plate 158. Plate 158 is welded or otherwise fixedly secured to the sleeve 166.

At 170, I have shown a locking plate, projecting radially from and rigid with the inner end portion of the rock shaft 142. As will be noted, when the rock shaft is in the position thereof shown in FIGURES 2 and 5, with the handle 144 locked in the notch 145, the locking plate 170 will abut against the abutment plate 168, so as to limit the clevis support plate against movement in a counterclockwise direction, viewing the same as in FIGURE 5, away from its FIGURE 5 or traction position.

In use of the trailer structure shown in FIGURES 1–15, and assuming that the trailer is to be inclined to the FIGURE 7 position thereof so as to define a ramp for the purpose of facilitating loading of the trailer, the clevis 156 is engaged with the hitch element 126. With the rock shaft 142 rotated to an unlocking position so as to locate the locking plate 170 clear of the abutment plate 168, one need merely back up the traction vehicle 122 to a slight extent.

As a result, the clevis pivots about its axis defined by pin 162, to the position of the clevis shown in FIGURES 7 and 8. This causes the clevis support plate 158 to move to its FIGURE 8 position, due to the fact that the clevis is pivotally joined to the connecting rods or links 154, the front ends of which are pivotally attached to depending arms 152, which arms are rigid with support bar 138, said support bar in turn being rigid with the trailer frame. The clevis, accordingly, pivoting clockwise on the front ends of links 154 from the clevis position shown in FIGURE 5, swings the clevis support plate 158 downwardly, and this, in turn, causes an upward movement of the front end of the frame, due to the connecting links 154 extending between the clevis and the arms 152 that are rigid with the trailer frame.

In this way, responsive to a slight backing of the truck, the trailer is caused to be inclined to its FIGURE 7 position. This locates the rear end of the trailer almost at ground level, so that a heavy piece of earth-working equipment can be driven directly onto the trailer, the trailer serving as a loading ramp. In fact, the trailer can be used as a loading ramp in the loading of the traction vehicle, if desired.

Thereafter, if the supported object moves forwardly beyond a predetermined point, it will over-balance the inclined trailer, so as to exert a downward pressure on the front end portion of the trailer, effective to return the trailer to a level position. The trailer simply moves rearwardly to a slight degree, while returning to a level position with the traction vehicle stationary. Alternatively, if the trailer still remains inclined, the traction vehicle can be moved forwardly, and this will cause the hitch mechanism to be straightened out to the FIGURE 5, traction position thereof. Straightening out of the hitch mechanism causes a downward pull to be exerted on the front end of the trailer frame, effective to return the trailer frame to a level position.

When the hitch mechanism is straightened out in this way, one rotates the rock shaft from its FIGURE 8 to its FIGURE 5 position, so that the plate 170 now is disposed as a stop engaging the abutment plate 168. This locks the clevis and the clevis support plate 158 against relative movement from their FIGURE 5 to their FIGURE 8 positions.

Locking of the hitch mechanism does not, however, prevent the same from clockwise movement, viewing the same as in FIGURE 5, so that if the traction vehicle moves upwardly while passing over an obstruction in the road surface, the hitch mechanism will swing clockwise from its FIGURE 5 position, as necessary, thereafter returning to said FIGURE 5 position when the obstacle is passed.

It is important to note that the movement of the trailer frame from its normal, level position shown in FIGURE 9 to its tilted position shown in FIGURES 7 and 11, is caused to occur by the operation of the hitch mechanism in the manner described above, taken in conjunction with the operation of the wheel assemblies 42, in particular, the bell cranks and the interconnecting linkages 106 thereof. Thus, as seen in FIGURE 9, when the trailer frame is in level position, the wheel axes 74, 76, 78 are all in a horizontal plane, parallel with the ground surface. The trailer frame is also in a horizontal plane.

When the upward pressure is exerted against the front end of the frame, the frame rocks upon the wheel assemblies, with the front bell crank swinging upwardly from its FIGURE 9 to its FIGURE 11 position. An upward pull is exerted also, though to a slighter degree, upon the middle pivot pin 58, so as to rock the middle bell crank 64 upwardly to a slight degree about the axis defined by the wheel spindle 76.

This tends to move the connector bar 112 upwardly, at the same time rocking the same in a counterclockwise direction to a slight extent about the pivot defined by the pin 120. The result is that the connector link 108 moves slightly to the right from its FIGURE 9 to its FIGURE 11 position, with the bell crank 62 swinging downwardly to a slight degree from its FIGURE 9 position, about the wheel spindle 74.

Thus, in a tandem wheel arrangement wherein there are three wheels at each side of the trailer, there is an interconnected linkage between the wheels at each side, designed to permit the entire trailer frame to rock to an inclined position, with the trailer frame being properly supported on all three wheels when so inclined.

Of course, when the truck moves forwardly with the hitch mechanism straightening out from its FIGURE 8 to its FIGURE 5 position, the wheel assembly components will revert from their FIGURE 11 to their FIGURE 9 positions, with the trailer now being level during its normal forward movement.

Assuming that the trailer were to encounter rough terrain as in FIGURE 12, each wheel is permitted to move upwardly or downwardly in respect to the other wheels. Thus, in FIGURE 12 the middle wheel is shown passing over a hump in the ground G. In these circumstances, the middle wheel spindle 76 will pivot upwardly about the pin 58, while the wheel spindle 78 swings downwardly about the bell crank pivot 60. The linkage 106 keeps the several wheels interconnected, so that each wheel serves as a limit upon the other two wheels, with respect to the up-and-down movement of the several wheels. This eliminates individual springing between each wheel suspension and the frame, while at the same time retaining the benefits of a tandem wheel mounting, with the trailer frame remaining substantially level, even though the several wheels may be passing individually over obstructions encountered during the motion of the trailer.

Turning now to the construction shown in FIGURES 16–19, in this embodiment of the invention the trailer has four wheels, with a tandem arrangement of two wheels at each side.

The modified trailer has been generally designated 172, and includes a rectangular, flat frame 174, having side rails 176 fixedly secured to end rails 178. The frame is cross braced by cross members 180, and at selected locations longitudinal brace members 181 may be provided, fixedly connected between selected cross members of the frame.

The frame is longitudinally reinforced by a pair of longitudinal truss rails 182, and connected therebetween is a pair of transverse truss rails 184.

In this form of the invention, the front and rear wheel suspensions are identical to those of the first form, with the intermediate wheel and its associated suspension being left off. Thus, there are rear and front hangers 44, 48, respectively, rigid with the frame. Pins 56, 60 are provided, as in the first form, the outer ends of said pins being carried by downwardly divergent rear and front brackets or arms 50, 54 respectively. Bell cranks 62, 66 are included in the rear and front wheel suspensions respectively, said bell cranks pivoting upon the pins 56, 60. Wheel spindles 74, 78 are carried by the rear and front bell cranks respectively, and rotatably carried by the spindles are the rear and front wheels 80, 84.

Since there are only two wheels at each side of the trailer, the three-wheel linkage 106 is not employed. Instead, a connecting link or rod 186 is pivotally connected at 188, 190 to the bell cranks 62, 66, respectively.

By reason of this arrangement, in the normal, level position of the trailer the components will appear as in FIGURE 17. At this time, the wheel spindles are in a common horizontal plane, the pivot pins 56, 60 being in the same plane as the wheel spindles.

Assuming that the trailer is moving over rough ground, as in FIGURE 18, each wheel may move upwardly, or downwardly, as required, while the trailer frame remains in a substantially level position. Thus, in the illustrated example the front wheel 84 has moved upwardly, its bell crank 66 pivoting counterclockwise from the FIGURE 17 to the FIGURE 18 position. This is accompanied, through the medium of the link 186, by corresponding counterclockwise rotation of rear bell crank 62, so that the wheel spindle 74 travels downwardly from its FIGURE 17 position, in an arcuate path about the center defined by the pivot pin 56.

The arrangement, also, of course, permits tilting of the trailer shown in FIGURES 16–19, for loading or unloading purposes, it being understood that in these circumstances, the bell crank 66 would swing upwardly in a clockwise direction about the wheel spindle 78, responsive to an upward pull exerted thereupon through the medium of the upwardly moving pivot pin 60. The rear bell crank 62 would also move upwardly, though to a slighter extent, and the connecting link 186 would move to an inclined position, from its FIGURE 17 position.

Wherever connecting links have been illustrated and described herein, it will be understood that preferably, these are of the type capable of adjustment as to length. Further, in each instance, the pivotal connection may be selectively located, through the use of a plurality of openings, any of which can receive the pivot pins joining the connecting links to the bell cranks or other components.

In the form of the invention shown in FIGURES 16–19, the hitch mechanism 132 is employed, without change in its construction. The operation of the hitch mechanism in relation to the wheel suspension is the same as in the first form of the invention, that is, the hitch mechanism may move between its loading and its traction positions, in conjunction with the relative movement of the wheel suspensions.

Another feature of importance resides in the fact that many components are interchangeable, between the first form and the second form of the invention. The front and rear wheel suspensions, including the hangers, bell cranks, etc., are identical in both forms, and the same is true of the hitch mechanism.

Another advantageous characteristic of the invention is found in the improved weight distribution. The wheel suspension provides for the average of all loads carried, including the weight of the trailer itself, to be exerted downwardly to an equal extent on each wheel, regardless of the terrain on which the wheels may be resting at the moment. This is true of both forms of the invention, of course. Even if one wheel may be elevated to a substantial extent relative to an adjacent wheel, the weight distribution will not change.

This means that when the load is carried either on the front or the back of the trailer, the percentage of the total weight carried in front of the balance point of the trailer will remain constant, even though the trailer may be in movement over particularly rough terrain.

The arrangement discussed immediately above also involves the carrying of identical loads by each tire of the trailer. Whenever a tire encounters a raised surface, which would cause a lifting of the load, the result is that each of the other tires of the trailer is immediately caused to assume its fair share of providing the lift and, consequently, the flexing motion of the individual wheel suspensions.

In a preferred arrangement, the load would be carried on the average of the elevation of three tire contact points, over a 60-inch space, in the first form of the invention. With this in mind, it may be considered that there will be three tires, on a side of the trailer, the suspensions of which are flexing equally at each call for a lifting of the load. One may further consider that if the trailer is theoretically moving over a planar surface, and suddenly encounters an obstruction of a 2-inch height, the lifting of the load would take place in three equal stages.

With these several factors all being kept in mind, it can be readily perceived why the system is substantially shock-free, and has a highly effective, surprisingly planiform movement of the frame and load when the trailer is in regular motion.

Further advantageous features of the invention are found in the wheel alignment arrangement. Referring to FIGURE 10, it will be observed that the intermediate hanger 46 is laterally, outwardly offset in respect to the hangers 44, 48. By reason of the illustrated arrangement, the length of the bell-crank-supporting portion of the pin or stub axle 58 is thus shorter than the corresponding portions of the pins 56, 60.

As a result, the bell cranks 62, 66 are permitted to move toward and away from the frame, that is, said bell cranks are slidable longitudinally of their associated pins 56, 60. The middle bell crank 64, conversely, is not permitted this movement longitudinally of its axle pin 58.

Assuming that all the wheels 80, 82, 84 are in line as shown by way of example in dotted lines in FIGURE 10, the bell cranks 62 and 66 will be disposed intermediate the opposite ends of their path of movement longitudinally of the pins. In other words, when the wheels are in line, as in FIGURE 10, it is possible for the bell crank 66 to move toward the frame, or away from the frame, as the case may be. This is also true of the bell crank 62. Their wheels 80, 84 must, of course, move therewith. In a preferred embodiment, the bell cranks 62, 66 would be permitted about one-inch movement either inwardly or outwardly from their normal positions shown in FIGURE 10.

Considering the size of the trailer, this would seem to be a very slight movement, and it will be noted, in this regard, that the several lengths or rods of the interconnecting linkage 106 are connected to immediately adjacent components sufficiently loosely to permit said connecting rods or links movement from their normal, FIGURE 10 positions to the extent of a maximum of about 15 degrees. This 15 degree movement, however, has been found to be more than ample, in view of the relatively small amount of movement that the bell cranks 62, 66 are permitted longitudinally of their pins 56, 60.

In any event, when the trailer is moving straight ahead, the several bell cranks and wheels will remain in line as in FIGURE 10. This is due to the fact that during the ordinary straight-line forward motion of the trailer, the trailer tends to remain level, and causes the components of the interconnecting linkage 106 to have a leverage advantage over the individual wheel suspensions constituted by the bell cranks and wheels. The wheels are thus maintained, it has been found in actual practice, in exact alignment, in the manner shown in FIGURE 10, except when the trailer is being pulled around corners.

When the trailer is being pulled around a curve or corner, the friction between the ground surface and the wheels will, so far as the front and back wheels of the first form of the invention are concerned, produce certain lateral pressures on the wheels that overcome the above-mentioned leverage advantage.

Consider, for example, that the trailer, viewed as in FIGURE 1, is making a left turn. In these circumstances, the left front wheel 84 will, at its point of contact with the ground surface, receive a lateral pressure tending to move the same inwardly toward the frame. Said left front wheel 84 will accordingly move laterally inwardly toward the frame to the extent permitted by the length of its axle pin 60, thus to be laterally inwardly offset in respect to the middle wheel 82.

The middle wheel 82 is the swivel point, and therefore, the left rear wheel 80 will move laterally outwardly from its normal, FIGURE 10 position, so that it will be laterally and outwardly offset in respect to the middle wheel 82.

The right front wheel 84, in these circumstances, will be caused to receive a pressure overcoming the above-mentioned leverage advantage, said pressure being exerted to the right in FIGURE 1 so as to cause the right front wheel 84 in FIGURE 1 to move laterally outwardly, while the rear right wheel 80 moves laterally inwardly.

This has been found to increase the life of the tires. Further, turning is accomplished more easily, and with minimum loss of traction. This is distinguished from ordinary tandem wheel suspensions of trucks and trailers, which are so designed as to cause the wheels themselves to move into planes angular to rather than parallel with the longitudinal center line of the vehicle on which they are mounted. In the present invention, the wheels remain at all times in planes parallel to the longitudinal center line of the trailer.

It is not inconceivable that the invention could also be embodied in other than four and six-wheel trailers. Therefore, the illustrations provided herein are considered to be merely exemplary, and not necessarily restrictive of the forms in which the invention can be incorporated.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any changes in construction that may be permitted within the scope of the appended claims.

What is claimed is:

1. A trailer comprising: a load-supporting frame; wheel suspensions of the tandem type mounted upon said frame approximately midway between the ends of the frame, the frame being supported upon said suspensions for longitudinal tilting movement between a normal level position, and an inclined position in which the frame extends ramp-fashion between a traction vehicle and the ground surface; and an articulated hitch mechanism including a clevis support plate pivotally connected to and projecting forwardly from the front end of the frame, a clevis pivoted intermediate its ends upon said plate, and a link pivotally connected to the clevis and having a pivotal connection to said frame, said plate, clevis, and link being relatively movable between a first position in which the front end of the frame is elevated to dispose the frame in its inclined position, and a second position in which the front end of the frame is lowered for disposition of the frame in the level position thereof.

2. A trailer comprising: a load-supporting frame; wheel suspensions of the tandem type mounted upon said frame approximately midway between the ends of the frame, the frame being supported upon said suspensions for longitudinal tilting movement between a normal level position, and an inclined position in which the frame extends ramp-fashion between a traction vehicle and the ground surface; and an articulated hitch mechanism including a clevis support plate having a rear end pivotally connected to the front end of the frame, said plate projecting forwardly from the frame, a clevis pivoted intermediate its ends on the front end of said plate, said clevis being adapted at one end for connection to a traction vehicle, and a link pivotally connected to the other end of the clevis, said plate, clevis, and link being relatively movable between a first position in which the front end of the frame is elevated to dispose the frame in its inclined position, and a second position in which the front end of the frame is lowered for disposition of the frame in the level position thereof.

3. A trailer as in claim 2 wherein said hitch mechanism further includes an abutment plate rigid with the clevis support plate, and lock means mounted on the frame for operation by a user into and out of a position in which said lock means engages the abutment plate against pivotal movement in one direction when the hitch mechanism is in the second position thereof.

4. A trailer as in claim 3 wherein said lock means includes a rock shaft rotatably mounted upon the frame, a handle secured to the rock shaft for rotation of the rock shaft by a user, and a lock plate affixed to and extending radially from the rock shaft for engagement with said abutment plate.

5. A trailer as in claim 4 wherein the hitch mechanism further includes a plate rigid with the frame and disposed for releasably, lockingly engaging the handle when the lock plate is in engagement with the abutment plate.

6. A trailer comprising: a load-supporting frame; wheel suspensions supporting the frame for longitudinal tilting movement between a level transport position and an inclined loading position, each suspension including a plurality of bell cranks spaced longitudinally of the frame and supported therefrom for pivotal movement about first axes, ground wheels mounted on the respective bell cranks for rotation about second axes, and a linkage extending between and having pivotal connections to the bell cranks about third axes, said linkage interconnecting the bell cranks for relative movement between predetermined limits, the first, second, and third axes being triangularly spaced on each bell crank; and a hitch mechanism on the front end of the frame, said hitch mechanism being articulated for operation between a first position in which said front end is elevated to dispose the frame in its inclined position, and a second position in which the front end is lowered for disposition of the frame in the level position thereof, and wherein said suspension includes a front bell crank, a rear bell crank, and at least one intermediate bell crank, said linkage including front, rear, and intermediate rods connected at one end to the respective bell cranks, and a connector bar to which said rods are connected at their other ends.

7. A trailer as in claim 6, wherein the connections of said rods to the connector bar are spaced apart longitudinally of the bar.

8. A trailer as in claim 7, wherein the front rod is connected to said bar at a location intermediate the opposite ends of the bar, the intermediate and rear rods being connected to the bar at the respective ends of the bar.

9. A land vehicle comprising: a load-supporting frame; tandem wheel suspensions mounted on opposite sides of said frame substantially centrally between the ends of said frame, said frame being supported on said suspensions for longitudinal tilting movement between a normal level position and an inclined position in which said frame extends ramp-fashion between a traction vehicle and the ground surface; said frame including a transversely-extending front end rail; a pair of mounting rods fixedly secured to said front end rail in axially-spaced relation relative thereto and projecting rearwardly therefrom, a tubular support bar extending between and having its opposed ends fixedly secured to said mounting rods, a pair of bearing arms having one of their ends fixedly secured to said support bar in axially-spaced relation and projecting rearwardly therefrom, a rock shaft journaled for rotation in said bearing arms, a handle fixedly secured to said rock shaft for the manual manipulation thereof, a lock plate fixedly secured to said rock shaft and projecting radially therefrom, said lock plate being disposed between said bearing arms, a pair of arms spaced axially of said support bar and having a pair of adjacent ends fixedly secured thereto, the other ends of said arms depending from said support bar, a sleeve telescoped over said tubular support bar for rotation thereon, a clevis support plate having an end thereof fixedly secured to said sleeve, the other end of said clevis support plate projecting beyond said front end rail, an abutment plate fixedly secured to said end of said clevis support plate and to said sleeve, said abutment plate in one position of said clevis support plate being engageable by said locking plate to hold said clevis support plate against rotation and said lock plate being rotatable out of engagement with said abutment plate to free said clevis support plate for rotation, a U-shaped clevis having a pair of arms pivotally connected intermediate their respective ends to said clevis support plate adjacent its other end, and a connecting link extending between and pivotally connected with each of said clevis arms and pivotally connected, respectively, with each of said arms depending from said tubular support bar.

10. A land vehicle as in claim 9, and means on said clevis support plate for limiting the pivotal movement of said clevis in one direction.

11. A land vehicle as in claim 9, and releasable means for holding said lock plate in locking position against said abutment plate.

References Cited in the file of this patent

UNITED STATES PATENTS

| | | |
|---|---|---|
| 2,717,707 | Martin | Sept. 13, 1955 |
| 2,838,191 | Schramm | June 10, 1958 |
| 2,932,418 | Ripley | Apr. 12, 1960 |